United States Patent
Ichikawa

(10) Patent No.: US 6,270,118 B1
(45) Date of Patent: Aug. 7, 2001

(54) SLIP PREVENTION APPARATUS AND VEHICLE EQUIPPED WITH THE APPARATUS

(76) Inventor: Yataro Ichikawa, 2-11-7 Kotesashi-Choo, Tokorozawa, Saitama Ken (JP)

(*) Notice: Subject to any disclaimer, the term of this patent is extended or adjusted under 35 U.S.C. 154(b) by 0 days.

(21) Appl. No.: 09/272,929

(22) Filed: Mar. 18, 1999

(30) Foreign Application Priority Data

Mar. 30, 1998 (JP) .................................................. 10-122611

(51) Int. Cl.$^7$ ......................................................... B60S 9/00
(52) U.S. Cl. ................................................................ 280/757
(58) Field of Search .................................. 280/757, 758; 291/3; 239/128, 270, 548; 165/41, 42, 43; 62/244

(56) References Cited

U.S. PATENT DOCUMENTS

| | | | |
|---|---|---|---|
| 5,042,567 | * | 8/1991 | Kajimoto et al. ........................ 165/42 |
| 5,100,175 | * | 3/1992 | Swallow et al. ......................... 280/757 |
| 5,350,035 | * | 9/1994 | Bodier et al. ........................... 180/271 |
| 5,580,106 | * | 12/1996 | Dulberg et al. ............................ 291/3 |
| 5,887,895 | * | 3/1999 | Easter .................................... 280/762 |

* cited by examiner

Primary Examiner—Paul N. Dickson
Assistant Examiner—Faye M. Fleming

(57) ABSTRACT

An apparatus and a vehicle equipped with the apparatus for preventing slip and keeping a good running on the ground including a road covered with frozen water such as ice and/or snow by cooling a wheel surface of the vehicle and/or a ground surface just in front of a point where the wheel comes into contact therewith by using cold air directly produced by expansion of compressed air in the running of the vehicle in response to change in the vehicle driving condition and further, dealing with a hydroplaning of the wheel on a wet ground surface at not freezing seasons by injection of the compressed air.

20 Claims, 4 Drawing Sheets

SLIP PREVENTION APPARATUS AND VEHICLE EQUIPPED WITH THE APPARATUS

BACKGROUND OF THE INVENTION

This invention relates to a slip prevention apparatus for running a vehicle safely on the ground including a road covered with frozen water such as ice and/or snow and the vehicle equipped with the apparatus. Up to this time, for the slip prevention on the ice and/or snow covered ground, vehicles are equipped with tire chains, spike tires or studless snow tires. Several slip prevention methods by the ground surface modification are known, such as scattering sand on the road surface (JP Provisional Publication No 208701/91), spreading engine exhaust gas (JP Provisional Publication No 229461/93), spreading liquefied gas (JP Provisional Publication No 293202/94). In another proposal, tires are cooled down by several degrees lower than the atomosphere by blowing air (JP Provisional Publication No 100703/75).

In these practiced or proposed methods, tire chains and spike tires are effective for the slip prevention but they damage dry road surface and the scraped road dust causes heavy environmental problems, thus the use of them is strictly limited.

The use of studless snow tire, for example, covered with foamed rubber increases a grip of the tire, does not damage dry road surface and the slip prevention is improved but not always satisfactory and they have still some problems, such as a large amount of abrasion of tire surface caused by its structure.

In case of a long distance running, the slip prevention with the sand scattered on the road needs a large amount of sand and the sand left over the road have a bad influence on the environment of the road. When engine exhaust gas is blown on an ice covered road, water film is formed on the surface, consequently the road becomes more slippery, so the object of slip prevention is not attained. The method of cooling road surfaces with liquefied gas can be expected to prevent vehicles from slipping but, since a road has a large heat capacity, the consumption of a large amount of such expensive materials is needed undesirably from economical and environmental points of view. The method of blowing air against tire for dropping the temperature by several degrees lower than the atmospheric one can prevent it from slipping, if the temperature of the atmosphere is low as about 0° C. but when the atmospheric temperature rises by more than several degrees from the freezing point of water, then the ice on the surface of the road melt to make the road slippery, so the several degrees temperature drop of the tires from the atmospheric temperature is not enough to attain the slip prevention, and moreover, the slippage depends on the speed of the vehicle and the change in its braking or driving force at braking, acceleration and the start, and the slip prevention is difficult to attain by the temperature control using the atmospheric temperature as a standard and the use of a usually and indirectly produced cold air is insufficient to cope with the problem.

SUMMARY OF THE INVENTION

An object of the invention is to provide a slip prevention apparatus and a vehicle equipped with the apparatus which enables the vehicle to run without any slip at the start, running and braking on the slippery ice and/or snow covered ground especially with ice and/or packed snow, and is suitable for a long distance drive and applicable to large sized vehicles, too.

Further object of the invention is to provide a slip prevention apparatus and a vehicle equipped with the apparatus that does not consume undesirable materials from economical and enviromental points of view.

These and other objects, features and advantages of the invention become more apparent upon a reading of the following detailed description and drawings.

Figure 1:
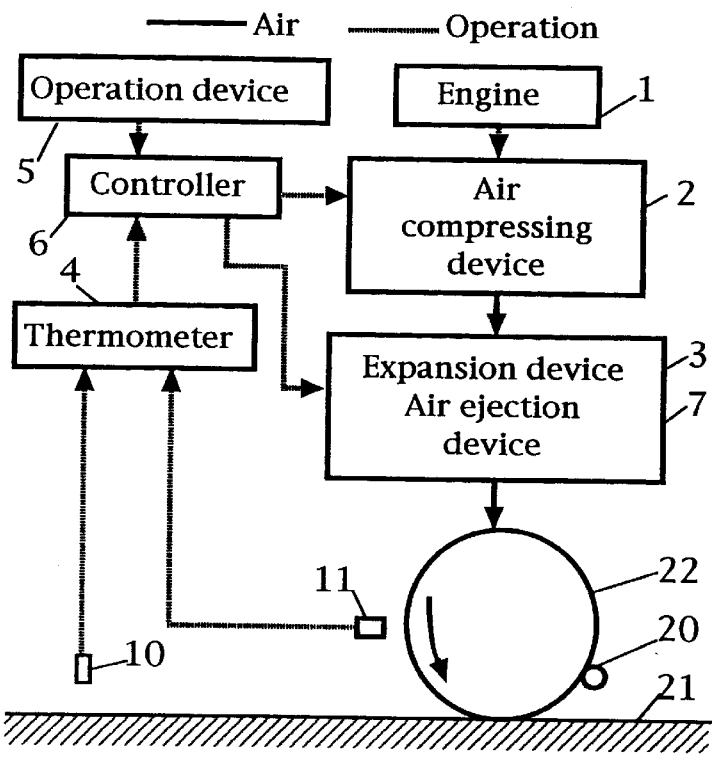
FIG. 1 is a block schematic diagram of an apparatus for embodying the invention.

| Expression of symbols | | |
|---|---|---|
| | 1 Engine | 2 Air compressing device |
| | 3 Expansion device | 4 Thermometer |
| | 5 Operation device | 6 Controller |
| | 7 Air ejection device | 8 Injection nozzle |
| 9, 24, 25, 26 | Control valve | 10 ground surface thermosensor |
| | 11 Wheel surface thermosensor | 12 Vehicle speed sensor |
| | 13 Wheel tachometer sensor | 14 Torque sensor |
| | 15 Acceleration sensor | 16 Brake pedal |
| | 17 Brake switch | 18 Accelerator pedal |
| | 19 Accelerator switch | 20 Moisture removing device |
| | 21 ground surface | 22 Wheel |
| | 23 Air supply conduit | 27 Air cooler |
| | 28 Air compressor | |

DETAILED DESCRIPTION OF THE INVENTION

This invention relates to a slip prevention by increasing the friction between the wheel surface and the ground surface by cooling at least one surface of the wheel and the ground covered with ice and/or snow (hereafter referred to frozen water) before the wheel. The mechanism of such increase in the friction is not clear, but it seems that a water film occuring on the ice and/or snow covered ground, or formed by the pressure of or the friction with the wheel is frozen promptly to adhere the wheels to the ground surface. To realize these situation, the wheel surface must have a temperature of lower than the freezing point of water, depending on the condition of the ground or the wheel surface and a speed of the wheel rotation. The temperature is generally lower than −10° C., preferably lower than −15° C., especially lower than −20° C., but is not limited to them.

The wheel surface has not the lowest limit in the temperature, but the temperature is generally higher than −60° C., preferably higher than −50° C. from economical and material viewpoints. It is effective for the slip prevention that the surface of the ice and/or snow covered ground is rapidly cooled by the contact with rotating wheels of which a temperature is cooled much lower than the surface temperature of the ice and/or snow covered ground. For this purpose, a coolant for the wheel surface is preferably used much more and/or is much colder than the surface of the ice and/or snow covered ground.

The expression "vehicle" as used herein means traffic body running with wheels like tire contacting with the ground including a road. They are automobile, trolley bus, railroad car with tires, linear motor car when running with tires, agricultural vehicle like tractor, working vehicle like road roller and fork lift truck and air craft running on the runway.

The expression "wheel" as used herein means a circular object of the vehicle which enable it to move along the ground including tire.

The expression "ground" as used herein means an area of land in the surface of the earth including road.

The expression "wheel surface" as used herein means at least a surface part of the wheel that comes into contact with the ground and "ground surface before the wheel" as used herein means a surface part of the ground at least before the wheel comes into contact therewith and "before" as used herein indicates a direction of the vehicle moving by the rotation of the wheel including being back the vehicle.

The expression "frozen water" as used herein means solid water or solidified water such as ice and/or snow packed or not.

Said temperature of the wheel surface is realized by cooling the wheels, especially the wheel surface. The cooling of rotating wheels is generally attained by allowing a fluid coolant like liquid or gas of lower than the temperature of the wheel surface to contact with the wheel surface.

As the fluid coolant, cold air is most preferable from economical and enviromental viewpoints in the invention. The air may be used at any temperature if the object of the invention can be attained, namely it is possible to cool the wheel surface and/or the ground surface to the objective temperatures. The temperature of the cold air is generally lower than −15° C., preferably lower than −20° C., especially lower than −25° C., but is not limited to these.

The cold air as a coolant for the invention is needed to be at a temperature lower than 0° C. in a relatively large quantity. But usually, low temperature air is produced by cooling atmospheric air indirectly through solid walls of heat exchanger with a lower temperature refrigerant like Freon(R), ammonia or ethylene etc. In these cases, because a large volume of atmospheric and relatively low temperature air is cooled down into much colder state by not so large difference of the temperatures between of the air and the coolant, a large apparatus including a big heat exchanger must be used for cooling the air, and the fed air must be very severely desiccated it, otherwise the apparatus can not avoid from its blockade. Such a large indirect apparatus is not proper for loading on a vehicle for producing the cold air.

In the operation of a vehicle, its running motion changes largely responding to its situations, for example, at the start, acceralation, braking or stop and the cooling apparatus must exactly follow these situation changes. But such prompt and exact response for producing the desired cold air is difficult in the usual case of the indirect-cooling system because it is required to have a large heat capacity which is unsuitable for such quick response.

The inventor has investigated on this problem and found to be most optimal that the air in the atmosphere is compressed, resultant temperature increased air is cooled down, in this case, the compressed air is effectively cooled with a compact heat exchanger, because it has relatively higher temperature and higher pressure compared to the atmospheric air which is fed in the above mentioned usual indirect cold air producing process. Then the compressed and cooled air is expanded to directly produce cold air for the cooling in the invention.

Any expansion of compressed air can be applied to the invention as long as a cold air is obtained at a desired one, and generally adiavatic or squeeze expansion can be used. If necessary, the compression, cooling or expansion may be repeated.

In the invention, the process for producing the cold air are operated almost under pressure and if want, at a temperature of higher than 0° C., so it does not need to strictly remove of moisture in the intake of atmospheric air.

According to this invention, quick response to the change in the vehicle driving conditions is attained by direct production of the cold air with expansion, for example, a request of colder air is promptly coped with increasing pressure of air. Any pressure or any temperature is allowable to the compressed air before expansion, if desired cold air is obtained by its expansion.

The pressure of the compressed air before expansion is generally more than 1.5 kg/cm$^2$ absolute, preferably more than 2 kg/cm$^2$ absolute and has no upper limit, but is generally lower than 20 kg/cm$^2$ absolute, preferably lower than 10 kg/cm$^2$. absolute The temperature of the compressed air before expansion is generally lower than 50° C., preferably lower than 20° C., especially lower than 10° C. and has not the lowest limit, but a temperature of higher than 0° C. is proper to avoid the freezing trouble of moisture in the intake air without removing the moisture, and needless to say, there is no obstacle to remove the moisture for cooling down the air to a temperature of lower than 0° C.

In the compressed air before expansion, higher pressure and lower temperature are more effective, but the pressure is more contributory. Therefore, higher pressure of the compressed air before expansion is preferable to get a colder air after expansion. For example, a compressed air before expansion at a temperature of 10° C. and at a pressure of 2 kg/cm$^2$ absolute can generate cold air of about −41° C. after adiabatic expansion, and at 5 kg/cm$^2$ absolute down to about −95° C. In case of the temperature of the compressed air before expansion is 5° C., the air at 2 kg/cm$^2$ absolute generate about −45° C. and at 5 kg/cm$^2$ absolute gives about −98° C.

Any known compressor can be used for producing the compressed air, if the air of such desired pressure is obtainable, and a reciprocating compressor, a centrifugal compressor, an axial flow compressor or a rotary compressor are cited as examples and they may be used in single or plural stages or in combination.

The compressor can be driven by a prime mover of the vehicle, another arranged engine or electric motor, or by an exhaust gas turbine of the vehicles engine. The pressure of the compressed air emitted from the compressor is regulated by a known method such as pistons stroke or a rotational frequency, an operation of throttle or bypass valves etc.

The temperature of the compressed air can be controlled by known methods. The compressed air produced by a compressor is generally cooled, generally with a heat exchanger using a known cooling media such as air, water, oil, glycols or other refrigerants like Freon(R), ammonia, other liquefied gas like LPG via a refrigerator or their combination.

The compressed air is expanded by known expansion devices such as turbine or expansion nozzle or their combination. The energy of the compressed air can be recovered from the expansion turbine operatively connected to the compression turbine by which the intake air is compressed or at least partially from an electric generator operatively connected to the expansion turbine. The turbine has further the function of shock relaxation on the expansion of the compressed air and can be expected to work as a silencer, and there is no obstacle to have any silencer.

According to this invention, a vehicle can be equipped with one expansion turbine and the cold air is delivered via insulated conduits to each wheel or the wheels may have the expansion turbines, respectively.

The cold air produced by an expansion nozzle may be lead to every wheel via conduits, but preferably, every wheel has each expansion nozzle to produce the cold air, and the nozzle may serve both as an expansion nozzle and as an injection nozzle.

A noise arising from the expansion of the compressed air in the nozzles may be reduced by connecting them to known silencers.

In case of a combination of the turbine and the nozzle, the compressed air is expanded to an intermediate pressure and temperature by expansion in the turbine, then the intermediate air to each expansion nozzle for releasing a desired cold air. The intermediate pressure and temperature is about 1.5~3 $kg/cm^2$ absolute and 0.5~5° C., but is not limited to them.

The compressed airs with two or more different pressures and/or temperatures can be produced and delivered via different conduits and then two or more kinds of compressed airs different in temperatures can be used to cool the surfaces to desired different temperatures.

Wheels may slip by losing its grip, when the braking force exceeds the friction force between the surfaces of the wheels and the ground, and so it is necessary to lower the temperature of the surfaces in braking more than in the normal running to promote the friction. This Temperature drop is suitably more than 5° C. and preferably 10° C. For this purpose, a larger amount of and/or colder air is quickly released to the surface of the wheels and/or the ground before the wheel in linking with an operation of a brake pedal.

In the rapid acceleration of a vehicle including its start on the ice and/or snow covered ground like a road, the slip of the driving wheels can be avoided by rapidly cooling the surface of the wheels and/or the ground before the wheels with an increased amount of and/or colder air released in linking with an operation of an accelerator pedal.

In case of change of operation of the vehicles, such as on the start, acceleration, braking, slipping, stopping etc, the cooling of the surface of the wheel and/or or the ground before the wheels is increased by dropping the temperature by more than 5° C., preferably more than 10° C. with the cold air controlled in an amount and/or a temperature with signals based on information of prescribed conditions of the operation, such as operations of the accelerator or braking pedal, acceleration detected by acceleration sensor, difference of wheel speed of rotation values between detected with wheel speed of rotation sensor and calculated backward from the vehicles speed (a large absolute value of the difference may suggest a slip), driving torque of wheels, difference of wheel speeds of rotation or rotational frequency between driven and not driven wheels etc.

The wheel surfaces are preferably cooled down all in the vehicle, and at least the driven wheels are cooled.

Any wheels for vehicles that have wheels contacting with the ground may be used for cooling, but generally, the wheel covered its surface with rubber, for example ordinary tire, snow tire, spike tire and studless tire are effectively used in the invention.

The vehicle equipped with the apparatus in the invention may have another merit of preventing its hydroplaning on a wet surface of ground in not freezing seasons by releasing of the hot compressed air before being cooled.

In case of the ice and/or snow covered ground, the moisture of liquid water or sherbet like snow sticks to the surface of the wheels and is frozen by the cold air and then the sticking ice gradually grows, so the running of the vehicle will be wrong, if without any action.

In order to prevent these troubles, a moisture removing device is arranged to contact with or leave a small space from the wheel surfaces and located in a position after contacting the ground and again cooling of the wheels with the cold air.

Any effective device for removing moisture can be used in this invention. Generally, the moisture is removed thermally, for example heating, hydraulically, for example, injection of fluid or mechanically. These device can be used singly or in combination with two or more. The thermal process is to heat with electric heaters, flames or infrared lamps, etc. The hydraulic process is to inject a fluid on the surface of the wheels using air, preferably the hot compressed air, engine exhaust gas, hot or cold water or steam etc. When hot fluid are used, a combination effect of heat and fluid can be expected, But the overheating of the wheel surface with such hot fluid is undesirable because its load on the cooling with the cold air. In using of water or steam as hydraulic fluid, it is preferable that an excess moisture of the surface is removed by combination of a thermal device and a mechanical one.

Air or engine exhaust gas are preferably used as the fluid in the hydraulic process at a higher temperature than the ambient one, and a hot compressed air before expansion to produce the cold air is especially preferable. The mechanical means scratches or wipes off the wheel surface with brushes, scrapers or rollers. They are rotatably, stationarily or movably set on the wheel surface as cotacting therewith or in a small interval.

Any material for the mechanical device may be used, if it is suitable for the object in the invention. Generally, they are made of metals, ceramics, plastics and natural or synthetic high polymers and used in the forms of moldings, fibers, yarns, wires, foams etc. Any metal may be used, if it is suitable for a structural material. They are, for example, stainless steel, iron like steel or cast iron, copper, aluminium, nickel, chromium, tungsten, molybdenum, titanium, zirconium their alloys etc. Natural high polymers used in the invention are, for example, wood, bamboo, hemp palm, coconut fiber or rubber etc. Synthetic high polymers used are, for example, polyethylene, polypropylene, polyamide, polyester, polycarbonate, ABS resin, polyurethane, polyvinylchloride, phenolic resin, synthetic rubber or their composites etc. but the material to be used in the invention are not limited to the above mentioned materials.

A moisture sticking to the mechanical device can be removed by heating, injecting of the hot compressed air or engine exhaust gas, mechanically scratching, vibrating, or in their combination.

The moisture removing means is combined properly with the mechanical means and the hydraulic means or the heating means.

It must be not so heated to avoid an excessive load on the desired cooling of the wheel surface with the cold air in the means by heating or injecting the hot fluid. And a perfect removing moisture is not always necessary, if the vehicle is possible to continue a running successfully.

Referring now to the drawings, the constitution and actions of the apparatus in the invention is explained. But the invention is not limited to them.

Referring to FIG. 1, there is shown a block schematic diagram of an apparatus for carrying out an embodiment of the invention. This apparatus comprises mainly air compressing device 2 directly or indirectly driven with engine 1, expansion device 3, thermometer 4, operation device 5, controller 6 regulate the cooling of the wheels and/or the ground surface with signals based on the information detected by 4 and/or 5, air ejection device 7 and, if necessary, moisture removing device 20. Air compressing device 2 comprises air compressor 28, air cooler 27 and if necessary, compressed air storage. Expansion device 3 comprises expansion turbine and/or expansion nozzle. In case of compressing air with a turbo-compressor it can be fitted to expansion turbine coaxially.

Figure 2:
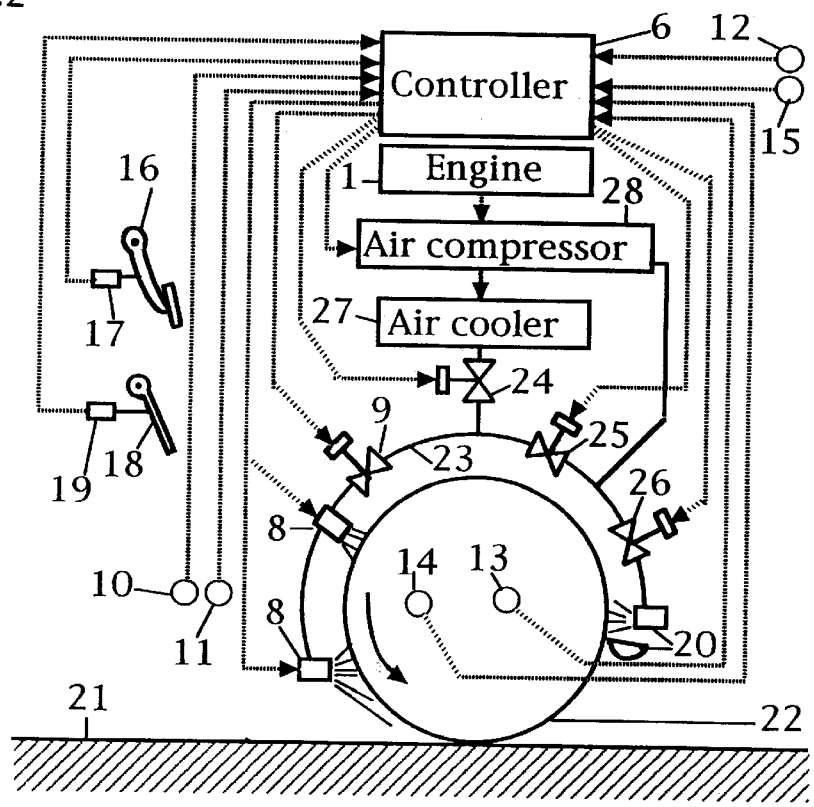
FIG. 2 is another block diagram of an apparatus for embodying the invention.

Referring to FIG. 2, thermometer 4 comprises thermosensors for ground surface 10 and for wheels surface 11, and non-contact type thermometer is usually used such as a photo emission thermometer etc.

Operation device 5 comprises accelerating means such as vehicle speed sensor 12 wheel tachometer sensor 13, accelerator pedal 18 and accelerator switch 19, braking means such as brake pedal 16 and brake switch 17, torque sensor 14 and acceleration sensor 15.

Air ejection device 7 comprises air supply conduit 23, control valves 9, 24, 25, 26 and injection nozzle 8. A position and direction of the injection and opening of the injection nozzle are regulated by order of the controller 6, so the compressed air is injected to the desired position and direction of the wheel and/or the ground surface before the wheel with a desired amount and temperature. Injection nozzle 8 can be replaced with expansion turbine or expansion nozzle.

Figure 3:
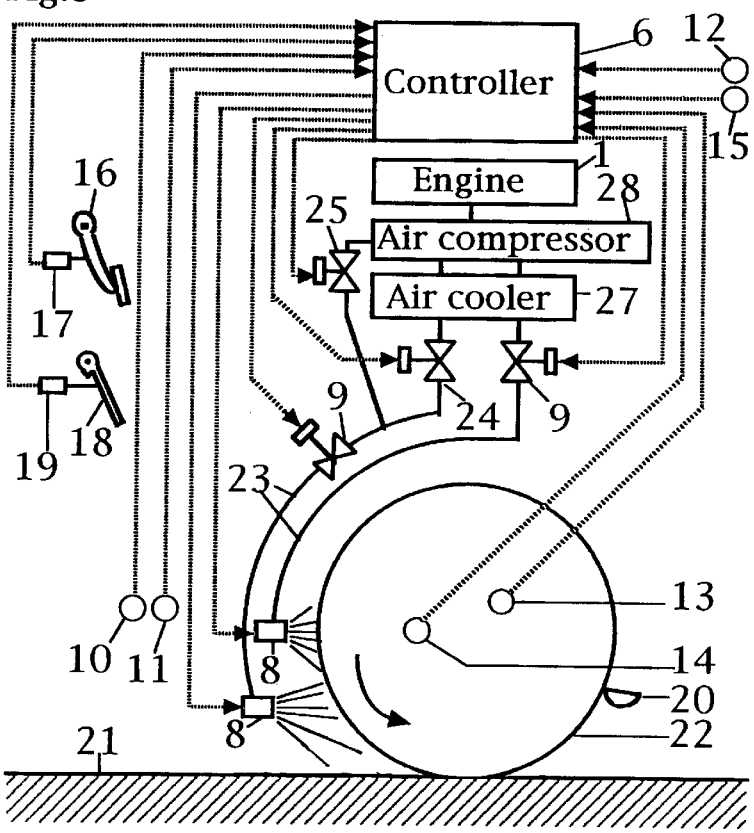
FIG. 3 is a block diagram of a compressed air supplying system with two lines in the invention.

Referring to FIG. 3, there is shown an example of supplying the cold airs different in temperature via two routes.

Referring to FIG. 2, there is illustrated schematically an embodiment of running a vehicle on an ice and/or snow covered ground about one wheel in the invention.

After the start of engine 1, air compressor 28 is driven, then the compressed air is cooled by the air cooler 27 and the cooled compressed air is injected to the wheel surface and/or the ground surface before the wheel as the cold air produced by expansion through injection nozzle 8 doubled as expansion nozzle from conduit 23, via control valves 9, 24 and closing valve 25 by the order of controller 6 based on the temperature information on the temperatures of the wheels and the ground surfaces detected by thermometer 4, and then the vehicle starts after the confirmation of its slip prevention by cooling the wheel surfaces and/or the ground surfaces before the wheel.

It is desirable to maintain at a temperature of the wheel surface of lower than that of the ground surface, therefore, in the running of the vehicle, its wheels may be continuously contacting with the regulated cold air, if necessary.

In the start or the rapid acceleration of the vehicle, its slip is prevented by cooling the wheel surfaces and/or the ground surfaces before the wheels by using a larger amount of and/or colder air produced by expansion of the compressed air of more increased pressure through injection nozzle 8 also acting as expansion nozzle via control valves 9, 24 and closing valve 25 by the order of controller 6 based on information about a driving torque more than prescribed which is detected by torque sensor 14, and/or actions of accelerator switch 19 linked for operations of more than prescribed of accelerator pedal 18 such as its sudden stepping.

When a vehicle drops its speed, its slip can be avoided by the same way of said acceleration of the vehicle based on the information about an action of brake switch 17 linked for operation of brake pedal 16 instead of the acceleration means. When the wheel is hard to rotate by braking, the cooled part of the wheel surface can not come into contact with the ground and a friction between the wheel and the ground surfaces is reduced. For avoiding this affairs, a gentle braking, the so called pumping braking and/or an injection of the cold air to the ground surface before the wheels are effective. Referring to FIG. 2, the injection nozzles 8 are adjusted positions and/or directions of the injection or arranged with plural numbers for this purpose.

To prevent a hydroplaning of the wheel on a wet surface of ground without ice or snow, water films on the ground surface are removed by direct injection of the hot compressed air which is produced by compression of an atmospheric air through injection nozzles 8, also acting as expansion nozzles via control valves 9, 25 and closing valve 24 by the order of controller 6 without passing through air cooler 27.

When the running of the vehicle is or is foreseen to be in the face of a difficulty caused by the moisture sticking from the ground on to the wheel surface and the freezing of the sticked moisture which is cooled with the cold air through the injection nozzle 8 resulting from a rotation of the wheels, the situation can be solved by the operation of a moisture removing device 20, and the device may be operated always or as calls in the running of the vehicle on the ice and/or snow covered ground.

Schematic illustrations of a moisture removing device of the invention is presented in FIG. 4~10. But the invention is not limited to these illustrations.

Figure 4:
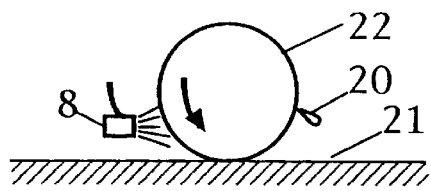
FIG. 4 is a partial diagrammatic view of a moisture removing device in the invention.

FIG. 4 is a schematic illustration of a movable scraper embodying the invention.

Figure 5:
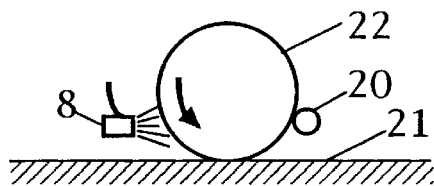
FIG. 5 is a partial diagrammatic view of another moisture removing device in the invention.

FIG. 5 is a schematic illustration of a roller embodying the invention.

Figure 6:
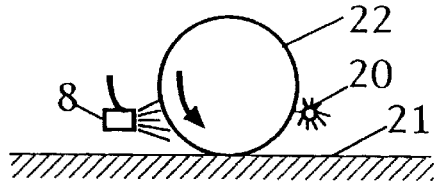
FIG. 6 is a partial diagrammatic view of another moisture removing device in the invention.

FIG. 6 is a schematic illustration of a rotary metal brush embodying the invention.

Figure 7:
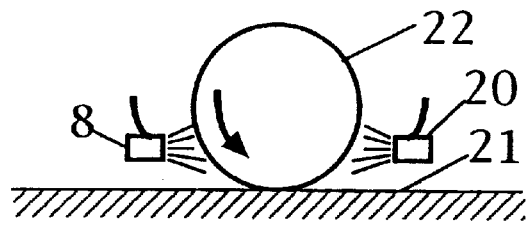
FIG. 7 is a partial diagrammatic view of another moisture removing device in the invention.

FIG. 7 is a schematic illustration of a device of injection with a compressed air or an exhaust emission gas embodying the invention.

Figure 8:
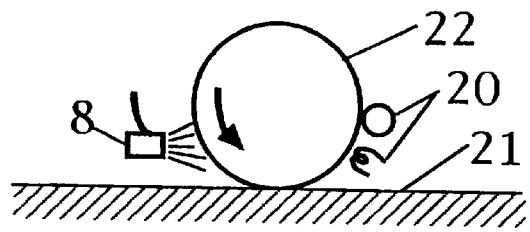
FIG. 8 is a partial diagrammatic view of another moisture removing device in the invention.

FIG. 8 is a schematic illustration of a device combined with an electric heater Sand a roller embodying the invention.

Figure 9:
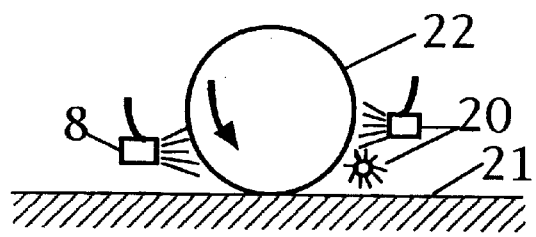
FIG. 9 is a partial diagrammatic view of another moisture removing device in the invention.

FIG. 9 is a schematic illustration of a device combined with a rotary metal brush and an injecting nozzle of a compressed air or an exhaust emission gas embodying the invention.

Figure 10:
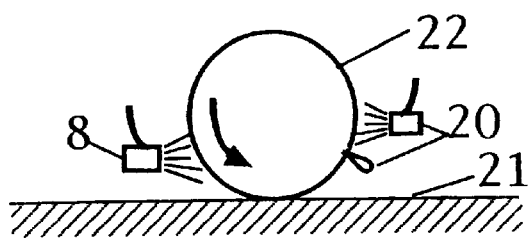
FIG. 10 is a partial diagrammatic view of another moisture removing device in invention.
Figure 11:
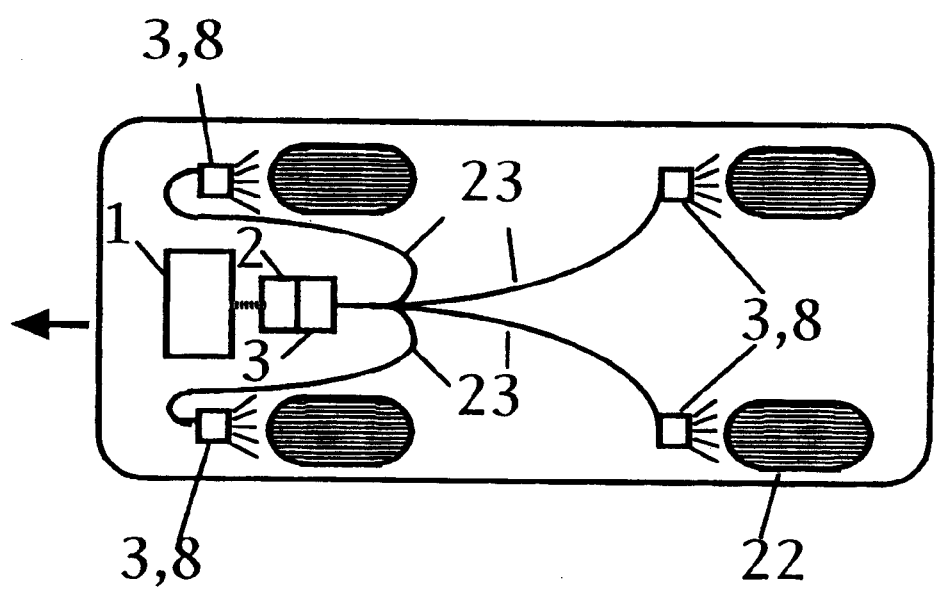
FIG. 11 is a diagrammatic view of supplying cooled air to wheels in the invention.

FIG. 10 is a schematic illustration of a device combined with a scraper and an injecting nozzle of a compressed air or an exhaust emission gas embodying the invention.

The driver of a vehicle can prevent its slip and keep its other functions by operating the apparatus of the invention in the drivers seat at will without consumption of the materials undesirable from the economically and enviromental points of view, and the damage of the ground surface using the tire chains or spike tires can be avoided, the trouble in equipping them can be avoided and the hydroplaning on a wet ground surface in not freezing seasons may be effectively prevented.

It is further understood by those skilled in the art that the forgoing description is a preferred embodiment of the disclosed apparatus and that various changes and modifications may be made in the invention without departing from the spirit and scope thereof.

I claim:

1. An apparatus for preventing a wheel from slipping on a ground surface at least partially covered with frozen water by modifying at least one surface of the wheel and the ground in front of the wheel comprising:

means for directly producing cold air by expansion of compressed air, and means for cooling said at least one surface with said cold air.

2. An apparatus according to claim 1, wherein the apparatus further comprising:

means for cooling said compressed air.

3. An apparatus according to claim 1, wherein a temperature of the cold air is at least partially regulated by controlling a pressure of the compressed air.

4. An apparatus for preventing a wheel from slipping on a ground surface at least partially covered with frozen water by modifying at least one surface of the wheel and the ground in front of the wheel comprising:

means for directly producing cold air by expansion of compressed air, means for cooling said at least one surface with said cold air, and means for enhancing the cooling of said at least one surface in response to at least one signal from at least one driving condition.

5. An apparatus according to claim 1, wherein said cooling is performed with the cold air having a temperature lower than −15° C.

6. An apparatus according to claim 1, wherein said at least one surface is the wheel surface.

7. An apparatus according to claim 1, wherein said at least one surface is the ground surface at least just in front of a point where the wheel comes into contact therewith.

8. An apparatus according to claim 1, wherein said at least one surface is both the wheel surface and the ground surface at least just in front of a point where the wheel comes into contact therewith.

9. An apparatus according to claim 1, wherein a temperature of the wheel surface is adapted to be set lower than a sensed temperature of the ground surface at least just in front of a point where the wheel comes into contact therewith.

10. An apparatus for preventing a wheel from slipping on a ground surface at least partially covered with frozen water by modifying at least one surface of the wheel and the ground in front of the wheel comprising:

means for directly producing cold air by expansion of compressed air, means for cooling said at least one surface with said cold air, and means for removing moisture of the wheel surface located in a position after the wheel contact with the ground surface and before the wheel is cooled with said cold air.

11. A vehicle equipped with the apparatus as claimed in claim 1.

12. A vehicle equipped with the apparatus as claimed in claim 2.

13. A vehicle equipped with the apparatus as claimed in claim 3.

14. A vehicle equipped with the apparatus as claimed in claim 4.

15. A vehicle equipped with the apparatus as claimed in claim 5.

16. A vehicle equipped with the apparatus as claimed in claim 6.

17. A vehicle equipped with the apparatus as claimed in claim 7.

18. A vehicle equipped with the apparatus as claimed in claim 8.

19. A vehicle equipped with the apparatus as claimed in claim 9.

20. A vehicle equipped with the apparatus as claimed in claim 10.

* * * * *